United States Patent [19]

Goshima et al.

[11] Patent Number: 4,675,692

[45] Date of Patent: Jun. 23, 1987

[54] DOT PRINTING METHOD AND APPARATUS

[75] Inventors: Takeshi Goshima, Yokohama; Mineo Nozaki, Kawasaki; Hiroshi Fukui, Yokosuka, all of Japan

[73] Assignee: Canon Kabushiki Kaisha, Tokyo, Japan

[21] Appl. No.: 699,197

[22] Filed: Feb. 7, 1985

[30] Foreign Application Priority Data

Feb. 13, 1984 [JP] Japan ................................ 59-24792

[51] Int. Cl.[4] ............................ B41J 3/12; B41J 3/20; G01D 9/00

[52] U.S. Cl. ................................ 346/1.1; 101/93.04; 346/76 PH; 400/120; 400/121; 400/126

[58] Field of Search ............... 400/120, 121, 126, 210; 101/93.04, 93.05; 346/76 PH, 1.1

[56] References Cited

U.S. PATENT DOCUMENTS

| | | | |
|---|---|---|---|
| 4,079,824 | 3/1978 | Ku | 400/124 |
| 4,090,059 | 5/1978 | Kilby et al. | 219/216 |
| 4,140,406 | 2/1979 | Wolf et al. | 400/124 |
| 4,407,003 | 9/1983 | Fukui | 346/76 PH |
| 4,431,319 | 2/1984 | Karaki | 400/124 |
| 4,453,167 | 6/1984 | Motoyoshi | 400/120 X |
| 4,479,132 | 10/1984 | Iwakura | 346/76 PH |
| 4,492,965 | 4/1985 | Ohnishi | 400/120 X |
| 4,494,126 | 1/1985 | Todoh | 346/76 PH |
| 4,510,505 | 4/1985 | Fukui | 346/76 PH |
| 4,528,572 | 7/1985 | Sasaki | 346/76 PH |
| 4,559,542 | 12/1985 | Mita | 346/76 PH |

FOREIGN PATENT DOCUMENTS

| | | | |
|---|---|---|---|
| 36074 | 10/1976 | Japan | 346/76 PH |
| 11878 | 1/1980 | Japan | 346/76 PH |
| 185168 | 11/1982 | Japan | 400/240.4 |
| 212970 | 12/1983 | Japan | 400/120 |

OTHER PUBLICATIONS

*IBM Tech. Disc. Bulletin,* by D. E. Cutshall, vol. 21, No. 1, Jun. 1978, pp. 284–285.

*IBM Tech. Disc. Bulletin,* D. W. Skinner, vol. 21, No. 5, Oct., 1978, pp. 1828–1829.

*Primary Examiner*—Paul T. Sewell

*Attorney, Agent, or Firm*—Fitzpatrick, Cella, Harper & Scinto

[57] ABSTRACT

A printing head has two or more columns each consisting of a vertical array of dot printing elements. A pulse motor moves the printing head relative to paper, and another pulse motor line feeds the paper upon printing each line. The columns of the head print dots in a superposed manner at high speed under the control of a CPU including memories for storing 7-dot patterns and a control program, respectively.

10 Claims, 28 Drawing Figures

FIG. 15
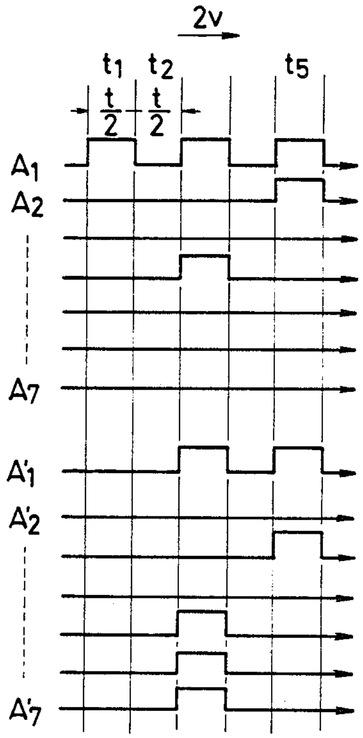
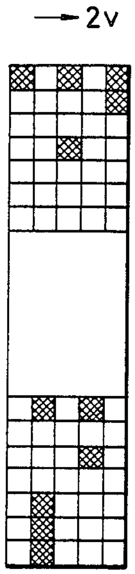
FIG. 16(A)
FIG. 16(B)
FIG. 17
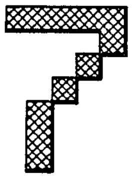

FIG. 22
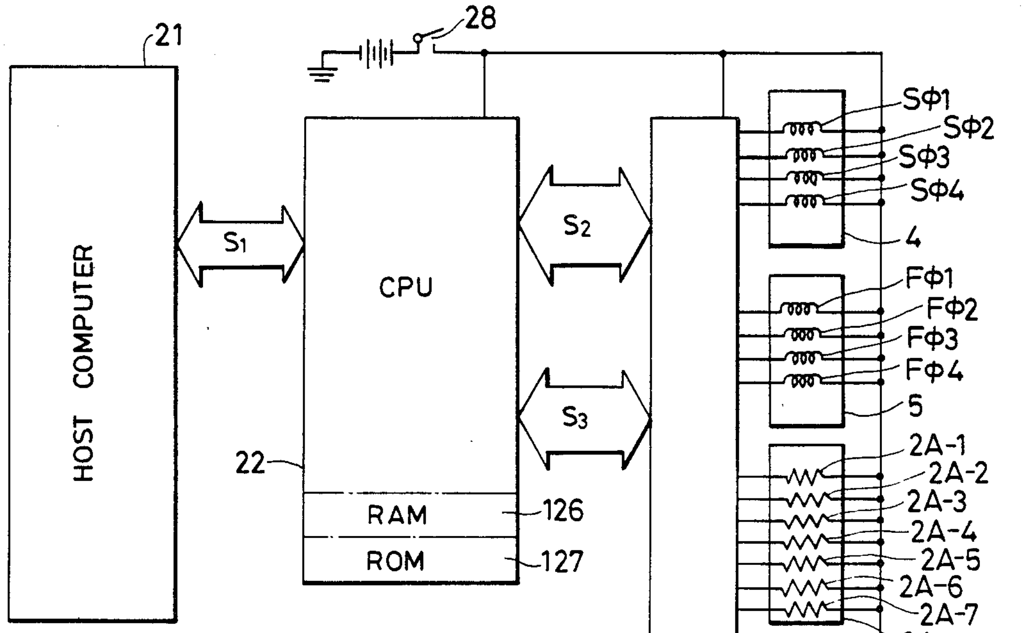
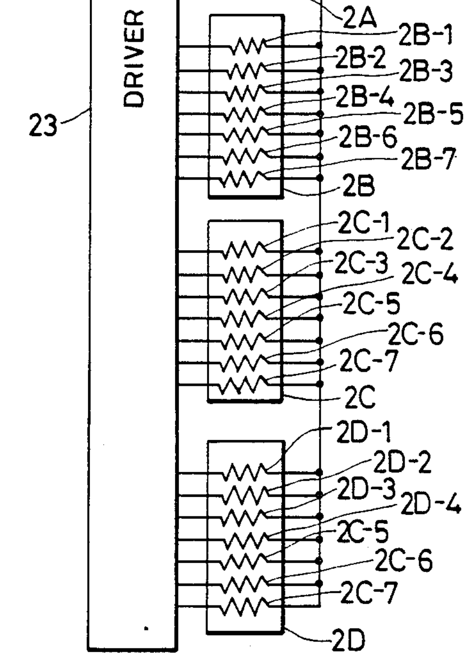
FIG. 22-1
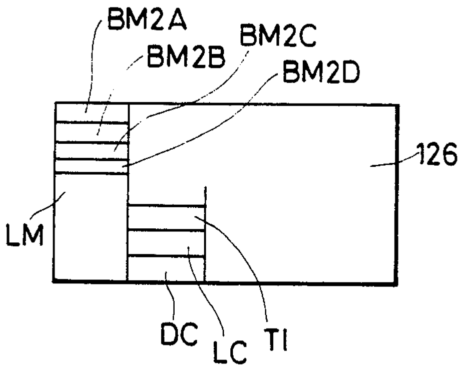

DOT PRINTING METHOD AND APPARATUS

BACKGROUND OF THE INVENTION

1. Field of the Invention

The present invention relates to a dot printing method and apparatus, wherein printing means having a plurality of columns each consisting of a plurality of dot printing elements is used and the printing means and recording medium are moved relative to each other to perform dot matrix printing (including image recording).

2. Description of the Prior Art

Dot printing is widely performed in a printer of thermal type using thermal paper or in a printer of thermal transfer type using normal paper, or, again in an ink-jet printer.

Dot printing is classified into serial printing for printing in units of columns, and line printing for simultaneously printing a plurality of columns or a line.

A conventional serial printing method will be described with reference to FIGS. 1 to 3.

Referring to FIG. 1, a printing head 1 has a column 2 consisting of a vertical array of a plurality of (7) dot printing elements C1 to C7. Wires C1 to C7 for individually driving the elements C1 to C7 are connected thereto. A common ground line G is connected to the elements C1 to C7.

The printing head 1 is moved along paper in a direction of arrow while the dot printing elements C1 to C7 are turned on or off at proper timings. Thus, a character (which may include a number, symbol, or figure) such as a number "7", for example, is printed as illustrated in FIG. 2.

FIG. 3 is a timing chart showing the drive timings of the dot printing elements C1 to C7 when the number "7" in FIG. 2 is printed. The number "7" is printed by driving the element C1 at all steps t1 to t5 and the elements C2 to C7 at steps as illustrated in FIG. 3. When a time period of each step is represented by t, the element drive time in each step, i.e., the heating time in a thermal printer or the ink injection time in an ink-jet printer is set to be t/2 which is half the period of each step. Thus, printing at desired density is performed.

When a high-speed printer, for example, a printer having a double speed is to be realized with such a single column dot printer, a method can be adopted wherein the element drive time is reduced to t/4 which is half that of the normal printer and the moving speed is doubled so that the time period of each step is kept at t/2. However, with this method, the drive time of each dot, i.e., the heating time or the ink injection time is reduced to half. This results in light and unclear printing, as shown in FIG. 5.

In order to keep the printing density at a normal level, another method can be adopted wherein the element drive time is kept at t/2 which is the same as that in the normal printer but the overall printing process is performed at high speed (e.g., double speed). However, with this method, the head moving distance per step (time t) is increased (e.g., doubled). Then, the width of a printing column (width of columns L1, L2, ...) is doubled, and characters are elongated laterally to have a double width.

SUMMARY OF THE INVENTION

It is an object of the present invention to provide a dot printing method and apparatus for performing high-speed, high-quality printing.

It is another object of the present invention to simplify the construction of a printer.

It is still another object of the present invention to allow high-speed, clear printing.

The other objects, features and advantages of the present invention will become apparent from the following detailed description taken in conjunction with the accompanying drawings.

BRIEF DESCRIPTION OF THE DRAWINGS

FIG. 12-1 is a representation showing a RAM 26;

FIG. 15 illustrates the element drive timings for generating a numerical character 7 using the printing head construction illustrated in FIG. 8 and an alternating column print method;

FIGS. 16A and 16B illustrate the printing state for each dot column according to the element drive timings of FIG. 15;

FIG. 17 illustrates the superposition of the printing states for each column as illustrated in FIGS. 16A and 16B;

FIG. 22 is a block diagram of means for practicing the printing method shown in FIGS. 18 to 21.

FIG. 22-1 shows a RAM 126; and

DETAILED DESCRIPTION OF THE PREFERRED EMBODIMENTS

Preferred embodiments of the present invention will be described with reference to FIGS. 8 to 23.

FIGS. 8 to 11 show an embodiment of the present invention. A printing head 1 has a plurality of columns (two columns in this case) 2 and 2'. The column 2 consists of a vertical array of dot printing elements 2-1 to 2-7, and the other column 2' consists of a vertical array of dot printing elements 2'-1 to 2'-7. The columns 2 and 2' are spaced apart from each other to have a central distance corresponding to one dot. Drive electrodes A1 to A7 are connected to the left ends of the dot printing elements 2-1 to 2-7, and drive electrodes A'1 to A'7 are connected to the right ends of the dot printing elements 2'-1 to 2'-7. A common electrode G is connected to the opposing inner sides of the dot printing elements 2-1 to 2-7 and 2'-1 to 2'-7. Desired dot printing elements are driven by applying voltages between corresponding drive electrodes and the common electrode. The number of dots in each column must be large enough to form at least one character which is 7 in this embodiment.

Figure 9:
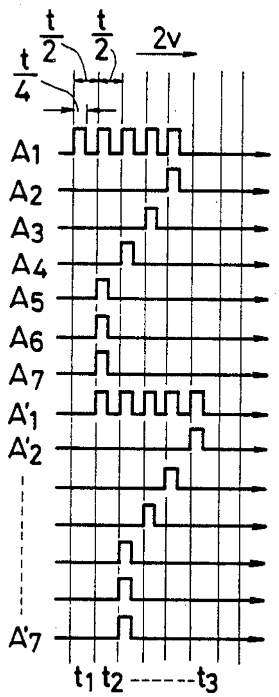
FIG. 9 illustrates the element drive timings for generating a numerical character 7 using the printing head construction illustraed in FIG. 8.
Figure 10A:
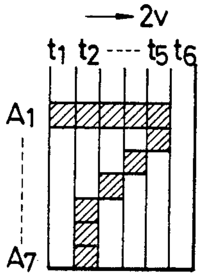
FIGS. 10A and 10B illustrates the printing state for each step, for printing element columns A and A' respectively, according to the element drive timings of FIG. 9.
Figure 10B:
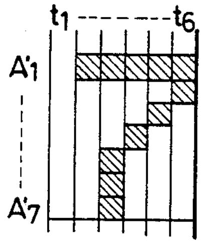

The columns 2 and 2', consisting of the elements 2-1 to 2-7 and 2'-1 to 2'-7, respectively, are driven with a time lag of 1 cycle, as shown in FIG. 9. These columns 2 and 2' therefore print the same printing pattern a plurality of times (twice in this embodiment) in the same position on thermal paper.

Figure 11:
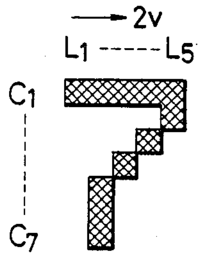
FIG. 11 illustrates the superposition of the printing states for each column as illustrated in FIGS. 10A and 10B.

With this printing method, high-speed printing can be performed by moving the printing head in the scanning direction at a speed 2 v which is double the normal speed v. When the drive time and non-drive time of each printing element are respectively set at t/4 and the step time is set at t/2 to double the printing speed, the printing density of each column 2 or 2' is reduced to half, as can be seen from FIGS. 10A and 10B. However, since the respective columns 2 and 2' print dots on paper in a superposed manner, the total element drive time (heating time or ink injection time) can be kept at t/2 which is the same as the normal time. Thus, a character of the same density and shape as in a normal printer can be printed as shown in FIG. 11 and is obtained by superposing the characters shown in FIGS. 10A and 10B.

With the method of the present invention, characters of the same density and shape as those of the conventional method can be printed at a double speed, thus realizing a high-speed printer.

In the embodiment described above, the columns 2 and 2' are arranged next to each other and are driven with a time lag of 1 cycle (time t/2). However, columns can be spaced apart by a distance corresponding to one column (or 1 step) or more and can be driven with a time lag of 2 steps (time (t/2)×2) for superposition printing. With this arrangement, printing of the same density can be performed at high speed, for example, at a double speed.

25 In the above embodiment, two columns 2 and 2' are used to print at a speed twice that of a normal printer. However, three or more columns can be used to print in a superposed manner so as to achieve printing at a speed three times that of a normal printer.

Figure 12:
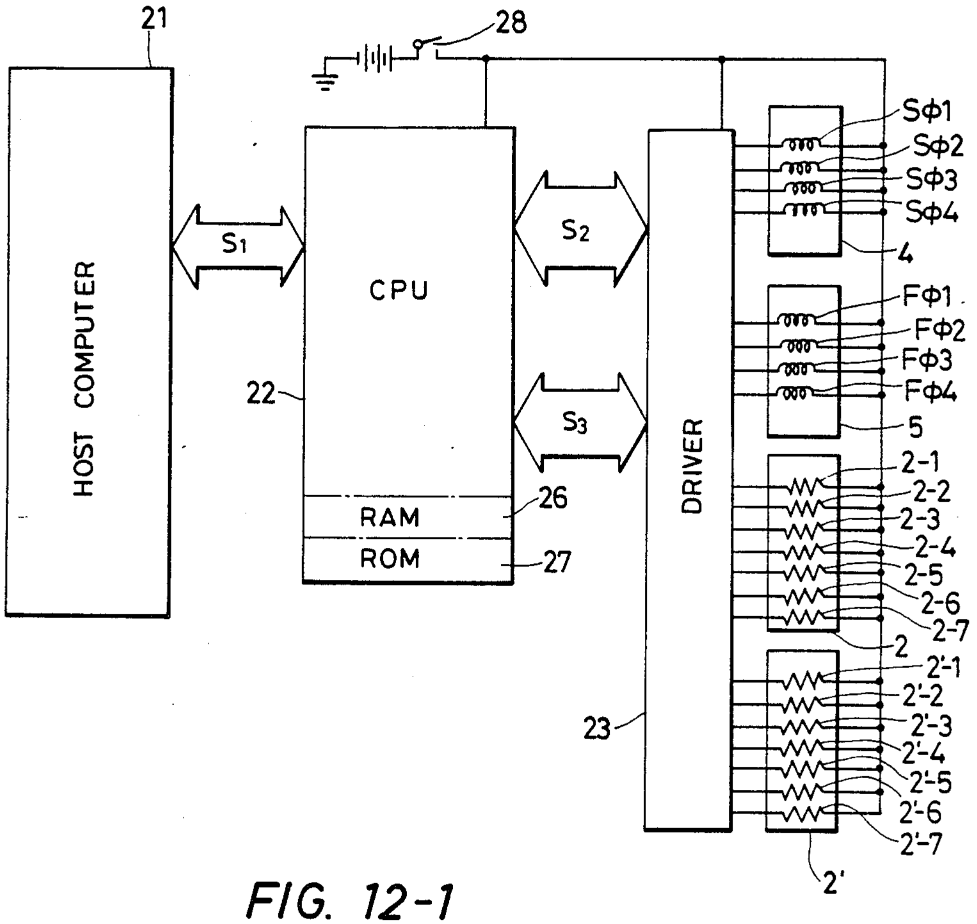
FIG. 12 is a block diagram of means for practicing the present invention.
Figures 1, 12:
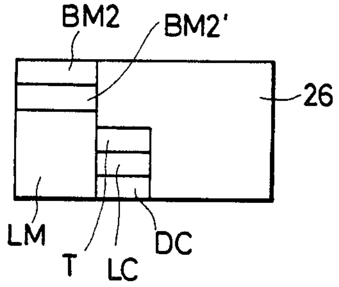

FIG. 12 is a block diagram of means for practicing the printing method shown in FIGS. 8 to 11.

Referring to FIG. 12, a host computer 21 controlling a printer as one unit of peripheral equipment is connected through a signal line S1 to a central processing unit (to be referred to as a CPU hereinafter) 22 for performing main control of the printer. The CPU 22 has a random access memory (RAM) 26 for use thereby and a read-only memory (ROM) 27 for storing a control program of the printer.

The CPU 22 controls a driver 23 thorugh signal lines S2 and S3. The driver 23 is connected to the dot printing elements 2-1 to 2-7 and 2'-1 to 2'-7 (corresponding to the heating elements of a thermal printer or dot elements of an ink-jet printer), excitation phases Sφ1 to Sφ4 of a pulse motor 4 for driving the printing head in the scanning direction, and excitation phases Fφ1 to Fφ4 of a pulse motor 5 for driving paper feed rollers to feed paper. The dot printing elements and the respective pulse motors are driven under the control of the CPU 22 and predetermined printing is performed.

Figure 1:
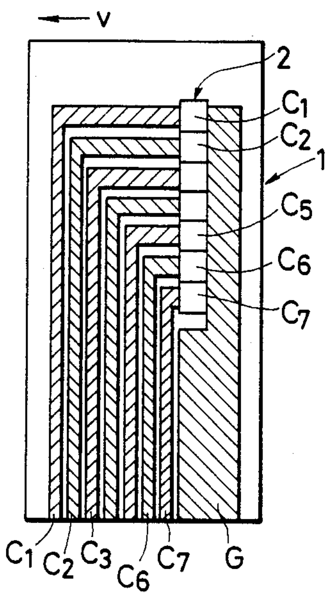
FIGS. 1 to 3 are views showing an arrangement of dot printing elements, a printed character, and drive timings of dot printing elements in a conventional dot printing method.

FIG. 12-1 shows the contents of the RAM 26. The RAM 26 has memory areas corresponding to a line memory LM, for storing in a dot matrix, printing data of one line transmitted from the host computer 21, buffer memories BM2 and BM2' arranged to correspond 7 columns 2 and 2' and for storing 7-dot data read out from the line memory LM, a dot counter DC for counting the number of printed dot columns, a line counter for counting the number of printed lines, and a timer T for counting the ON time of the dot printing elements.

When a power source 28 is turned on, the CPU 22, the driver 23, the columns 2 and 2' of the printing head, and the pulse motors 4 and 5 are rendered operative. When the power source 28 is turned on, the CPU 22 resets the dot counter and the line counter arranged in the RAM 26 for driving the dot printing elements.

Figure 13A:
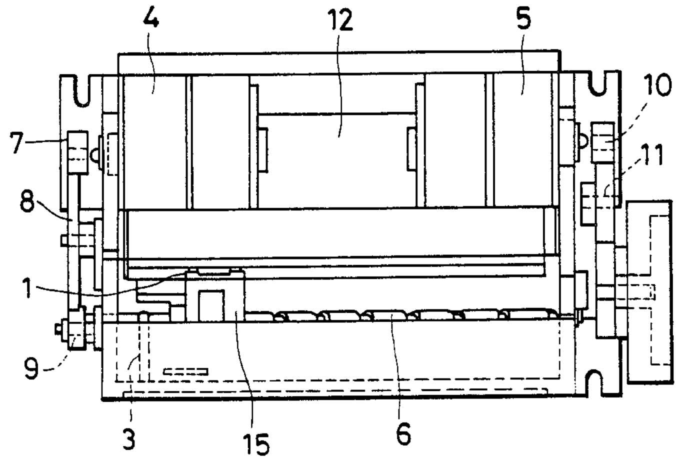
FIGS. 13A and 13B show the construction of a printer suitable for practicing the present invention.
Figure 13B:
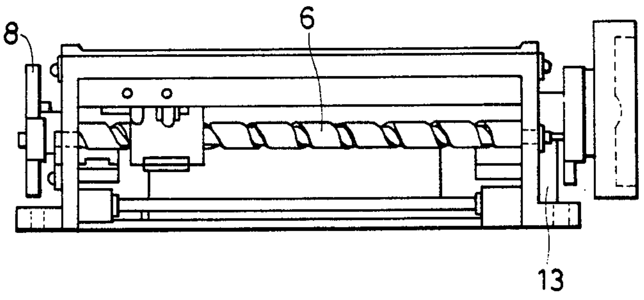

FIGS. 13A and 13B show the schematic construction of a thermal printer as one type of dot printer. A carriage 15 mounting a printing head (thermal head) 1 thereon is moved along a guide shaft 6 arranged parallel to a platen 12 in a direction perpendicular to the columns of the printing head. During this movement, the head 1 prints on thermal paper. With this printer, the carriage 15 is reciprocated along the guide shaft 6 by the pulse motor 4 through gears 7, 8 and 9. An end switch 3 supplies a return signal to the CPU 22 when it detects that the carriage 15 is at a return position.

The paper feed rollers urged against paper are driven by the pulse motor 5 through gears 10, 11 and 13 to line feed the paper.

Figure 14:
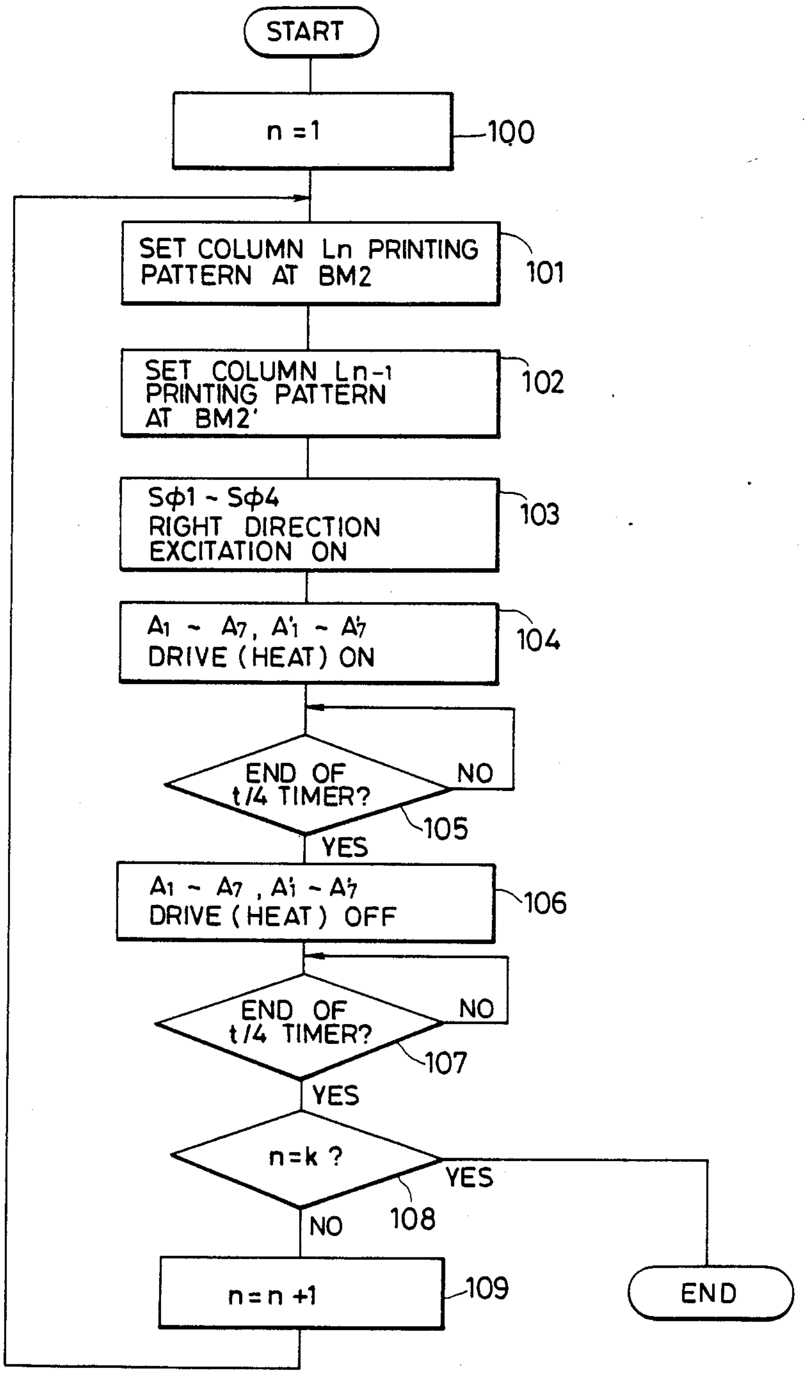
FIG. 14 is a flow chart showing the printing operation according to the method shown in FIGS. 8 to 12.
Figure 18:
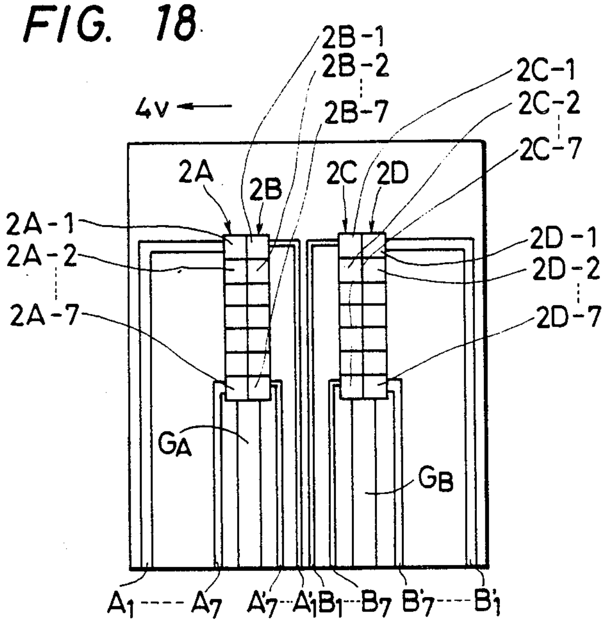
FIGS. 18 to 21 are views illustrating a dot printing method according to the third invention of the present invention and corresponding to FIGS. 8 to 12. 11, respectively.

FIG. 14 is a flow chart of the operation for practicing the embodiment shown in FIGS. 8 to 12.

In step 100, the dot counter DC is set at 1. The 7-dot pattern of the nth column (1st column in this case) of the line memory LM is set in the buffer memory BM 2 corresponding to the dot printing elements 2-1 to 2-7 (step 101). Then, the 7-dot pattern of the (n-1)th column in the line memory LM is set in the buffer memory BM2' corresponding to the dot printing elements 2'-1 to 2'-7 (step 102). However, in this case, since n−1=0, no pattern is present and therefore no pattern setting is performed. In this manner, the patterns of the columns which are shifted by one dot corresponding to the distance between the columns 2 and 2' are set in the buffer memories BM2 and BM2'.

Subsequently, the excitation phases Sφ1 to Sφ4 of the pulse motor 4 for driving the printing head 1 in the scanning direction are set in the right direction excitation ON state (step 103), and the elements 2-1 to 2-7 and 2'-1 to 2'-7 are turned on (step 104). It is checked if the element drive time has reached t/4 by the timer T (step 105). When YES in step 105, the elements 2-1 to 2-7 and 2'-1 to 2'-7 are turned off. After the elements are stopped (step 106), it is checked in step 107 if the non-drive period (element cooling period ) has reached t/4. It is then checked in step 108 if printing has been completed. For this purpose, it is detected if the count of the dot counter n has reached a value k which is larger by one than the maximum data column stored in the line memory LM. If NO in this decision step, the count of the dot counter DC is incremented in step 109 and the flow returns to step 101. The same operation is repeated. When the count of the dot counter DC reaches k, printing of one line is ended, the carriage is returned to the left margin, and line feed is performed for printing the next line.

In an example shown in FIGS. 15 to 17, a printing head 1 has a column 2 consisting of a plurality of elements 2-1 to 2-7 and a column 2' consisting of a plurality of elements 2'-1 to 2'-7. In this example, one column prints odd columns while the other column prints even columns so as to print at high speed.

According to this printing method, since the respective columns can be driven at the same time, the drive time of each column (heating time in a thermal printer or an ink injection time in an ink-jet printer) is kept at t/2 which is the same as in a normal printer while the printing speed is doubled. FIG. 16(A) illustrates printing (odd column printing) by the column 2 having the elements 2-1 to 2-7. FIG. 16(B) illustrates printing (even column printing) by the column 2' having the elements 2'-1 to 2'-7. When the two columns 2 and 2' print in this manner, a character having a uniform density as shown in FIG. 17 is printed. In this embodiment, while the printing head 1 moves for a distance roughly corresponding to one dot, the respective printing elements are driven and each dot is elongated slightly more than a normal dot. However, since the moving velocity of the head relative to thermal paper is fast, the two ends of each dot are not heated sufficiently and, in effect, do not print. For this reason, dots are not actually much elongated, resulting in printing of acceptable quality.

When the dot printing method shown in FIGS. 8 to 14 is combined with that shown in FIGS. 15 to 17, dot printing at still higher speed can be realized.

The present invention (third invention) provides such a dot printing method for realizing printing at a still higher speed. An embodiment of the third invention will be described with reference to FIGS. 18 to 23.

Referring to FIGS. 18 to 21, a printing head 1 has four columns 2A, 2B, 2C and 2D. Each column consists of a vertical array of a plurality of (7 in this embodiment) dot printing elements. More specifically, the column 2A has elements 2A-1 to 2A-7, the column 2B has elements 2B-1 to 2B-7, the column 2C has elements 2C-1 to 2C-7, and the column 2D has elements 2D-1 to 2D-7.

The columns 2A and 2B constitute a first column group, and the columns 2C and 2D constitute a second column group. Thus, two column groups are arranged on the head 1.

In the illustrated example, the two column groups are separated by a distance corresponding to three dots (three columns). In each column group, the columns (2A and 2B, 2C and 2D) are adjacent to each other having a central distance corresponding to 1 dot. Drive electrodes A1 to A7 are connected to the left end of the column 2A, and drive elements A'1 to A'7 are connected to the right end of the column 2B. A common electrode GA is connected to the opposing inner sides of the columns 2A and 2B. Drive elements B1 to B7 are connected to the left end of the column 2C, and drive elements B'1 to B'7 are connected to the right end of the column 2D. A common electrode GB is connected to the opposing inner sides of the columns 2C and 2D. When desired drive elements A1 to A7, A'1 to A'7, B1 to B7, and B'1 to B'7 and the common electrodes GA and GB are driven, desired printing elements can be driven.

Figure 19:
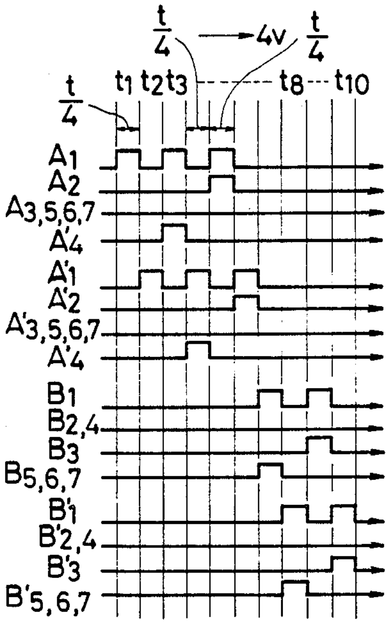
Figure 20:
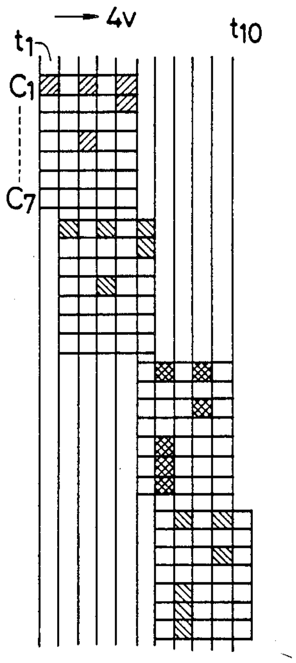
Figure 21:
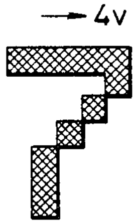

As shown in FIGS. 19 to 21, the respective columns in each column group (2A and 2B, 2C and 2D) are driven with a time lag corresponding to one dot (one step or one column) so that each single dot is printed twice in a superposed manner.

The respective column groups print different columns at a time. More specifically, when two column groups are used as in the illustrated embodiment, the columns 2A and 2B of one column group print odd columns, while the columns 2C and 2D of the other column group print even columns.

Figure 2:
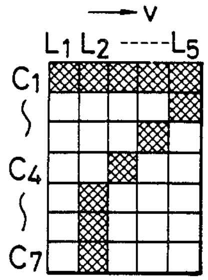
Figure 3:
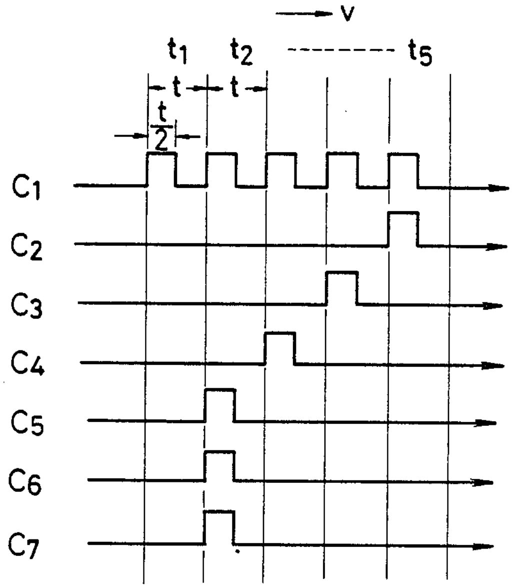
Figure 4:
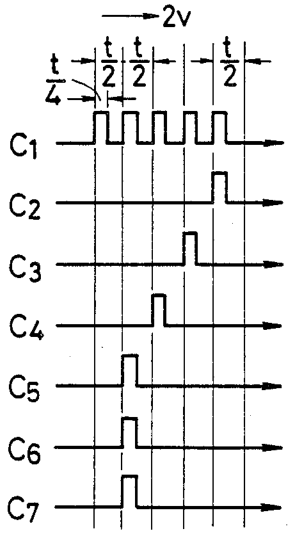
FIGS. 4 and 5 are views showing element drive timings and the printing state when the element drive time is reduced to half in order to double the printing speed in the conventional printing method.
Figure 5:
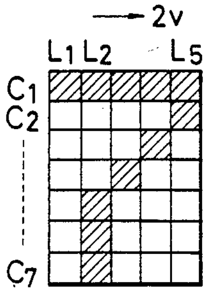
Figure 6:
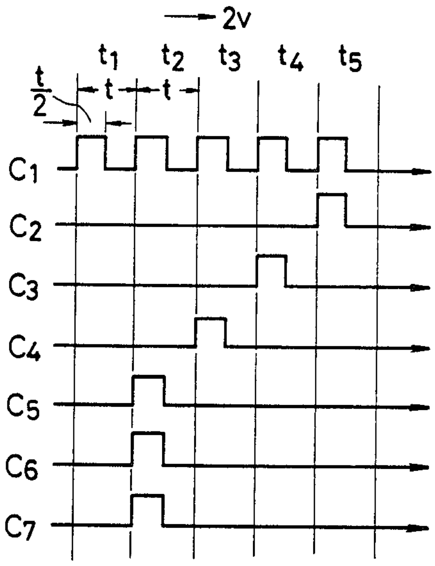
FIGS. 6 and 7 are views showing the element drive timings and the printing state when the element drive time is kept the same but the printing speed is increased to about double the normal speed in the conventional printing method.
Figure 7:
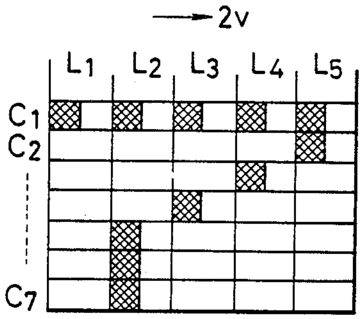
Figure 8:
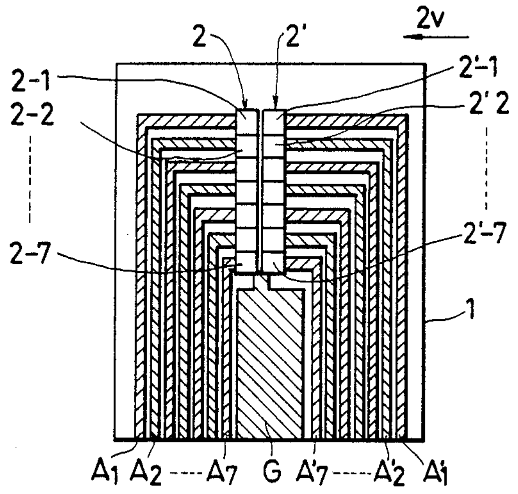
FIG. 8 is a schematic construction of a printing head according to the present invention.

In the printing method shown in FIGS. 18 to 21, dots can be printed at the same density as and at the same position as but at a speed four times that of the conventional printing method shown in FIGS. 1 to 3. Thus, as shown in FIGS. 19 to 21, when the printing head is driven in the scanning direction at a speed four times that of a normal printer and each step pass time tn is kept at t/4, the printing time of each dot, i.e., the total element drive time per dot can be kept at t/2.

In this manner, according to this embodiment of the present invention, compared with the conventional dot printing method, characters of the same shape and same density can be printed at a still higher speed than in the former embodiment of the present invention.

In the illustrated embodiment, two groups of columns each consisting of two columns are used to allow printng at a speed $2 \times 2 = 4$ times that of a normal printer. However, theoretically, according to this embodiment, when R column groups each consisting of P columns are used, a printing speed which is $P \times R$ times that of a normal printer can be obtained.

When four columns 2A to 2D are arranged as illustrated or when a plurality of (generally four or more) columns are used, when drive timings of the respective columns are properly adjusted, the column arrangement can be freely selected. More specifically, columns of one column group can be arranged next to those of another column group, and intervals between the respective columns can also be set arbitrarily.

FIG. 22 is a block diagram of means for practicing the dot printing method shown in FIGS. 18 to 21.

The block diagram is substantially the same as that shown in FIG. 12 except that the number of dot printing elements connected to a driver 23 is larger; elements 2A-1 to 2A-7, 2B-1 to 2B-7, 2C-1 to 2C-7 and 2D-1 to 2D-7 are connected to the driver 23, and a RAM 126 and a ROM 127 are modified in accordance with this change FIG. 22-1 is a representation showing the contents of the RAM 126. Referring to FIG. 22-1, the RAM 126 has buffer memories BM2A to BM2D for storing 7-dot patterns corresponding to the respective columns 2A to 2D, and a timer T1 for counting the drive time of each dot printing element. The remaining parts in FIG. 22 are the same as in FIG. 12, and a detailed description thereof will be omitted.

In this embodiment, the printing contents and control method illustrated are as shown in FIGS. 18 to 21 and are thus different from those of the former embodiment.

The method of this embodiment can be applied to the same type of printer (application equipment) as that in the former embodiment and is applicable to printers of dot printing type including the thermal printer shown in FIGS. 13A and 13B, various types of thermal printers (thermal or thermal transfer type), and ink-jet printers.

Figure 23:
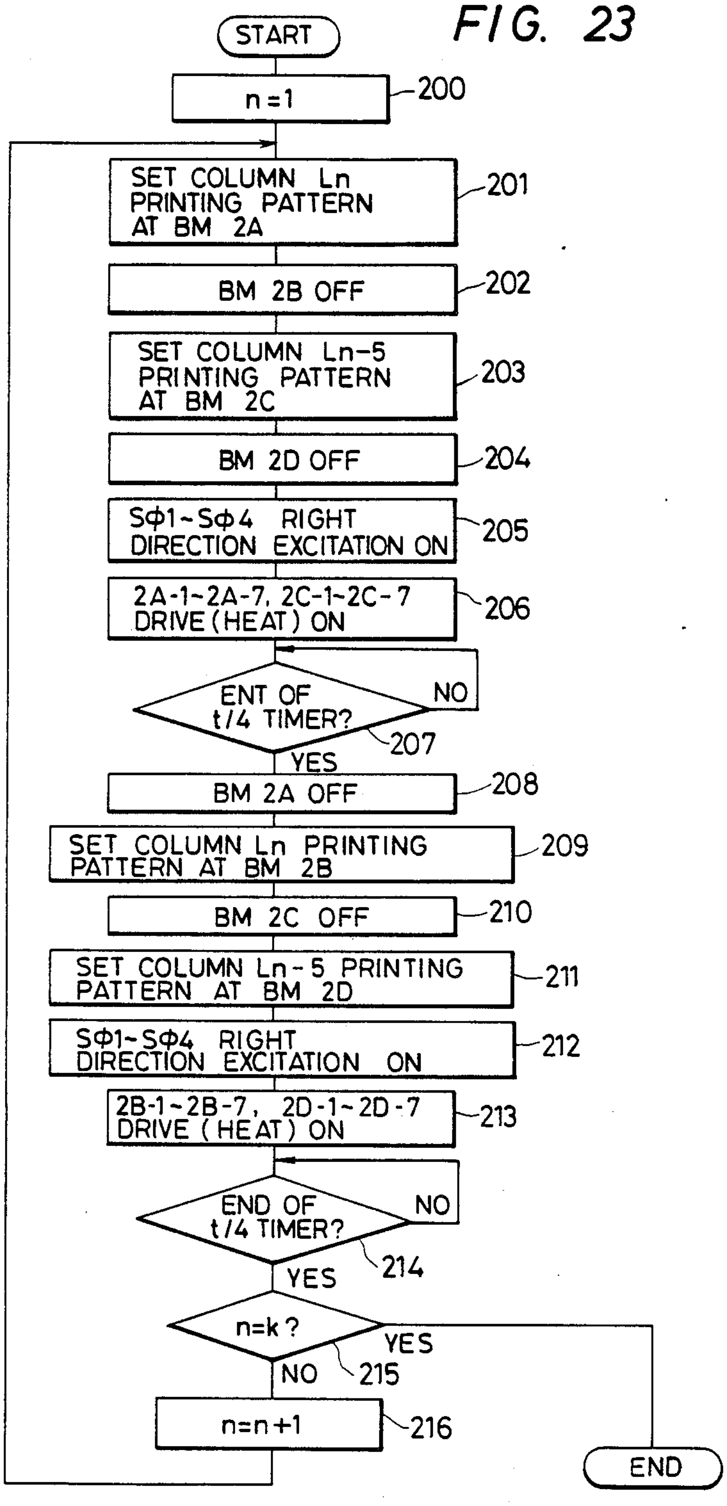
FIG. 23 is a flow chart showing the printing operation according to the printing method shown in FIGS. 18 to 22.

FIG. 23 is a flow chart of the operation for practicing the dot printing method shown in FIGS. 18 to 22. Referring to FIG. 23, 1 is set in a dot counter DC in step 200. The 7-dot pattern of the Lnth column (first column in this case) in the line memory LM is stored in the buffer memory BM2A, and the dot pattern of the L(n−n5)th (not present in this case) is stored in the buffer memory BM2C. At he same time, the buffer memories BM2B and BM2D are turned offf and no data is stored therein (steps 201 to 204).

Subsequently, excitation phases S$\phi$1 to S$\phi$4 of a pulse motor 4 for driving the printing head 1 in the scanning direction are set in the right direction excitation ON state (step 205). Then, the elements 2A-1 to 2A-7 and 2C-1 to 2C-7 are turned on (step 206). It is checked in step 207 if the time t/4 has elapsed. When it is determined that the time t/4 has elapsed, the buffer memories BM2A and BM2C are turned off, the printing pattern of the Lnth column is set in the buffer memory BM2B, and the printing pattern of the L(n−5)th column is set in the buffer memory BM2D.

Excitation phases S$\phi$1 to S$\phi$4 of the motor 4 are set in the right direction excitation ON state in step 212 and the elements 2B-1 to 2B-7 and 2D-1 to 2D-7 are driven (heated in a thermal printer) in step 213. When it is determined in step 214 that this state has been maintained for over t/4, it is then checked in step 215 if printing has been completed. As in the case of the former embodiment, this detection is performed in the following manner. That is, n is compared with k which is obtained by adding 5 to the maximum column position within the line memory LM. If n has not reached k, the flow returns to step 201 and the same process is repeated. When it is determined that n has reached k, printing of one line is ended.

The dot printing method according to the present invention as described above can be similarly applied to any dot printing method for printing characters or the like with dots as in optical printers for performing optical printing by irradiating a silver salt film with a light beam (laser beam or the like) or in electronic printers of electrostatic type in addition to thermal printers using thermal paper or normal paper or ink-jet printers. The same effect as obtained in the above embodiment can be obtained with such methods. More specifically, in the case of an optical printer, high-speed printing can be performed while keeping the intensity of a light beam the same as the normal level. In an electronic printer, high-speed printing can be performed while keeping the charge amount the same as the normal level.

The present invention is applicable not only to serial printers but also to full-multi printers wherein paper is moved relative to a printing head. That is, the present invention is applicable to printers wherein a recording medium and a printing head are moved relative to each other.

What we claim is:

1. A printing method for recording information on a recording medium, comprising the steps of:

providing a recording head for recording the information on the recording medium as the recording head and recording medium move relative to each other in a single recording direction, the recording head having a plurality of printing elements arranged in a first column transverse to the direction of relative movement of the recording head and recording medium and a plurality of printing elements arranged in a second column disposed upstream from the first column with respect to the recording direction, wherein the recording elements of the second column are aligned with the recording elements of the first column in the recording direction;

repeatedly actuating selected printing elements of the first column of printing elements to record patterns in accordance with print information as the recording head and recording medium move relative to each other in the single recording direction; and repeatedly actuating selected printing elements of the second column of printing elements corresponding to the actuated printing elements of the first column, to superposedly record with the same color the patterns recorded by all of the repeated selective actuations of printing elements of the first column, as the recording head and recording medium move relative to each other in the single recording direction.

2. A printing method for recording information on a recording medium, comprising the steps of:

providing a recording head for recording the information on the recording medium as the recording head and recording medium move relative to each other in a single recording direction, the recording head having:

(i) a first group of a plurality of printing elements arranged in a first column transverse to the direction of relative movement of the recording head and recording medium and a plurality of printing elements arranged in a second column disposed upstream from the first column with respect to the recording direction, wherein the recording elements of the second column are aligned with the recording elements of the first column in the recording direction, and (ii) a second group of a plurality of printing elements disposed upstream from the first group with respect to the recording direction, said second group being arranged in third and fourth columns of printing elements disposed with respect to each other in the same manner as the first and second columns of printing elements, respectively;

repeatedly actuating selected printing elements of the first and third columns of printing elements to record patterns in accordance with print information as the recording head and recording medium move relative to each other; and repeatedly actuating selected printing elements of the second and the fourth columns corresponding to the actuated printing elements of the first and third columns, respectively, to superposedly record with the same color the patterns recorded by all of the repeated selective actuations of printing elements of the first and third columns, respectively, as the recording head and recording medium move relative to each other in the single recording direction.

3. A method according to either claim 1 or 2, wherein each column comprises a number or printing elements sufficient to form an alphanumerical character.

4. A method according to either claim 1 or 2, wherein the distance between the centers of the first and second columns is equal to the transverse dimension of dots recorded by the printing elements.

5. A method according to claim 2, wherein one of the two groups effects the recording of odd dot columns and the other group effects the recording of even dot columns.

6. A method according to either claim 1 or 2, wherein the printing elements comprise heating elements, and the heating elements in the first and second columns have the same heating area.

7. A method according to either claim 1 or 2, wherein the printing elements of the first column are equal in interval and in number to the printing elements of the second column.

8. A method according to either claim 1 or 2, wherein the first and second columns of printing elements are actuated with a time lag.

9. A method according to either claim 1 or 2, wherein the printing elements are incorporated in a thermal printer.

10. A method according to either claim 1 or 2, wherein the printing elements comprise ink jet printing elements.

* * * * *

UNITED STATES PATENT AND TRADEMARK OFFICE
CERTIFICATE OF CORRECTION

PATENT NO. : 4,675,692

DATED : June 23, 1987

INVENTOR(S) : TAKESHI GOSHIMA, ET AL.

It is certified that error appears in the above-identified patent and that said Letters Patent is hereby corrected as shown below:

COLUMN 2

Line 33, "illustraed" should read --illustrated--.
Line 34, "illustrates" should read -- illustrate--.
Line 47, "12." should read --12;--.
Line 60, "the third invention" should read --another embodiment--.
Line 61, "12." should be deleted.
Line 64, "21." should read --21;--.

COLUMN 3

Line 32, "head in" should read --head 1 in--.
Line 33, "2 v" should read --2v--.
Line 60, "25" should be deleted.

COLUMN 4

Line 22, "7" should read --to the--.

COLUMN 6

Line 27, "pass" should read --past--.
Line 58, "change FIG." should read --change. FIG.--.

UNITED STATES PATENT AND TRADEMARK OFFICE

CERTIFICATE OF CORRECTION

PATENT NO. : 4,675,692

DATED : June 23, 1987

INVENTOR(S) : TAKESHI GOSHIMA, ET AL.

It is certified that error appears in the above-identified patent and that said Letters Patent is hereby corrected as shown below:

COLUMN 7

Line 13, "L(n-n5)th" should read -- L(n-5)th--.
Line 15, "offf" should read --off--.

Signed and Sealed this

Twenty-second Day of December, 1987

Attest:

DONALD J. QUIGG

*Attesting Officer* *Commissioner of Patents and Trademarks*